Patented Aug. 28, 1945

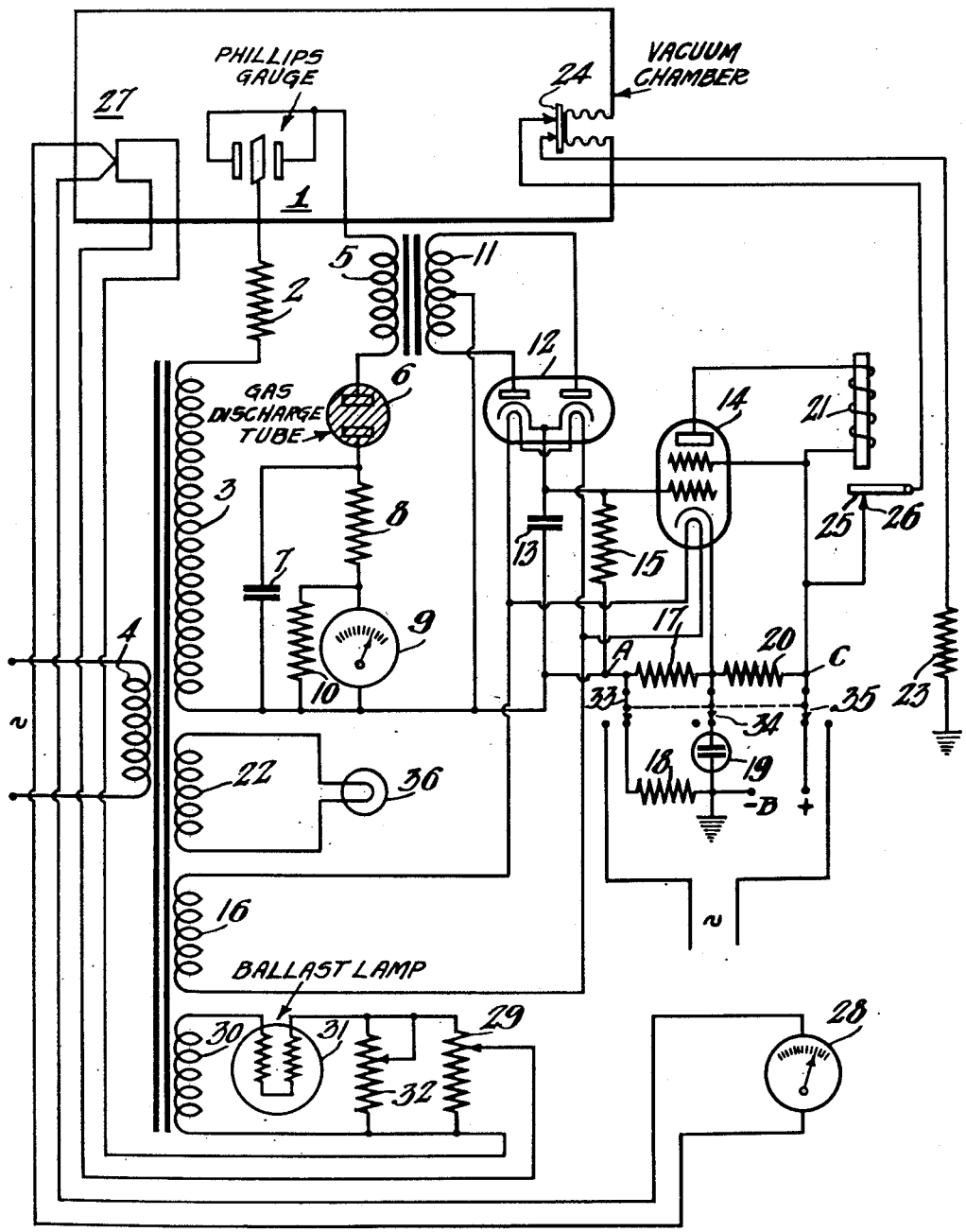

2,383,600

UNITED STATES PATENT OFFICE 2,383,600

VACUUM GAUGE INDICATOR SYSTEM

Igor E. Grosdoff, Upper Darby, Pa., assignor to Radio Corporation of America, a corporation of Delaware Application June 24, 1942, Serial No. 448,254

3 Claims. (Cl. 175—183)

This invention relates generally to gas pressure gauges and particularly to an improved means and method for utilizing a gas pressure gauge of the ionization type in which energization of a power circuit is controlled by the operation of the pressure gauge.

Heretofore, various types of pressure gauges have been utilized for indicating gas pressure or vacuum conditions within a sealed chamber. Among the most satisfactory devices for measuring the pressure at comparatively high vacuums is the well known ionization type gauge of which an extremely practical modification is known as the Phillips gauge. These devices and their applications are described in considerable detail in an article entitled "High-vacuum gauges" by F. M. Penning in Phillips' Technical Review, vol. II, No. 7 for July 1937 on pages 201 to 208 inclusive.

Briefly, the Phillips gauge comprises an ionization device including two parallel disposed electrode plates which are connected together to form a cold cathode, and a ring electrode interposed between the parallel disposed plates to form an anode. A relatively strong fixed magnetic field is applied in a direction perpendicular to the cathode plates to provide spiral electron paths between the cathode plates and the anode whereby the number of collisions between electrons and gas molecules between the cathode and anode are substantially increased to provide relatively high sensitivity at low gas pressure. The device thereby provides self-rectification of an alternating potential applied between the anode and cathode electrodes. The transmission characteristics of the device are a function of the gas pressure.

The instant invention contemplates the use of a plurality of different types of vacuum gauges for indicating the gas pressure within a sealed container over the effective ranges of the various gauges, including an electrical circuit associated with a Phillips gauge for controlling the energization of a power circuit. Such a vacuum gauge power interlock has great utility in the operation of an electron microscope, or similar device, in which an incandescent filament is enclosed within an evacuated container, the vacuum of which must be frequently reduced to atmospheric pressure during the operation of the device. In apparatus of this type, serious damage to the incandescent filament may result unless some automatic means is provided for de-energizing the filament when air is introduced into the container. The invention includes a circuit which may be energized, either partially or completely, from a source of alternating potential, thereby providing a simple and convenient system for accomplishing the result mentioned heretofore.

Among the objects of the invention are to provide a new and improved method of and means for measuring gas pressure within an enclosed chamber. Another object of the invention is to provide a new and improved method of and means for energizing an ionization type vacuum gauge by a source of alternating potential, indicating the pressure to which the gauge is subjected, and controlling the energization of an auxiliary load circuit in response to predetermined operation of the ionization gauge. Another object of the invention is to provide an improved method of and means for utilizing a plurality of vacuum gauges, of types responsive to different pressure ranges, in which the energization of all of the electric type gauges is provided by a source of alternating potential.

The invention will be described by reference to the accompanying drawing of which the single figure is a schematic circuit diagram of one embodiment thereof.

Referring to the drawing, one terminal of a Phillips vacuum gauge 1 is connected, through a high resistance 2, to one terminal of the secondary of a high voltage secondary winding 3 of a conventional power transformer. The transformer includes a primary 4 which may be energized from any suitable source of alternating potential. The remaining terminal of the Phillips gauge 1 is connected, through the primary 5 of a second transformer, to one terminal of a gas discharge tube 6 which may be of the well known neon type having a pair of electrodes. The remaining terminal of the gas discharge tube 6 is connected to one terminal of a bypass condenser 7, and to one terminal of a second resistor 8. The remaining terminal of the second resistor 8 is connected through a meter 9, to the remaining terminal of the capacitor 7, and to the remaining terminal of the high voltage secondary winding 3. A third resistor 10 may be connected across the extremely sensitive meter 9 if desired. The purpose of the second resistor 8 is to supplement the gaseous discharge tube 6 in limiting the maximum rectified current through the sensitive meter 9, while the capacitor 7 tends to smooth out variations in the pulsating D.-C. currents applied to the meter.

The terminals of the second transformer secondary winding 11 are connected respectively to the two anodes of a double diode rectifier tube 12. The two cathodes of the diode rectifier 12 are connected, through a second filtering capacitor 13, to the electrical center tap of the second transformer secondary winding 11, and to the control electrode of a thermionic tube amplifier 14. A third resistor 15 is connected in parallel with the second capacitor 13, and is also connected to the common terminal of the meter 9 and the high voltage secondary winding 3 to provide a grid bias voltage determined by the voltage drop across a resistor 17 for the grid of the tube 14. The heater elements of the double diode tube 12 and the amplifier tube 14 are supplied with alternating current from a low voltage secondary winding 16, which is part of the first transformer primary winding 4. An additional secondary winding 22 may be provided to energize a power indicator such as the lamp 36.

The cathode of the amplifier tube 14 is connected through the fourth resistor 17 to the common terminal of the meter 9 and the high voltage transformer secondary winding 3. This common terminal A is connected through a fifth resistor 18 to ground. A voltage regulator tube 19 is connected between the cathode and ground. The positive terminal of a source of anode potential B is connected to one terminal of a sixth resistor 20, to the screen electrode of the amplifier tube 14, and to one terminal of a relay winding 21. The remaining terminal of the relay winding 21 is connected to the anode of the amplifier tube 14. The negative terminal of the anode voltage supply B is grounded. The fourth and sixth resistors 17 and 20 provide a voltage divider for deriving proper grid, cathode, screen and anode voltages for the tube 14, while the voltage regulator tube 19 controls the cathode bias of the tube above ground.

One terminal of the electron gun 23 or any auxiliary load circuit is connected to ground, the remaining terminal of the gun is connected through a pressure responsive switch 24, located in the enclosed chamber, and through the relay contacts 25, 26, to the positive terminal of the anode potential source. It should be understood, of course, that any other type of load circuit including a separate power source could be controlled in the same manner.

An auxiliary vacuum gauge 27, of the thermocouple type which is also described in the publication mentioned heretofore, is enclosed within the sealed container. The thermal junction is connected to a sensitive D.-C. indicating meter 28. The heater component of the thermocouple 27 is connected to a source of alternating potential derived from the potentiometer 29. The alternating potential applied to the potentiometer 29 is derived from another low voltage secondary winding 30, coupled to the first transformer primary winding 4. The circuit includes a ballast lamp 31 and a shunt resistor 32, for regulating the load on the ballast lamp to provide maximum current regulation thereby.

As explained heretofore, the two electric type vacuum gauges 1 and 27 and the pressure responsive switch 24 are all enclosed within the gas chamber under observation. Preferably, the three pressure responsive devices are most efficient in different pressure ranges, whereby extremely broad control and indication of vacuum conditions are obtainable. In operation, when the pressure chamber is evacuated to a predetermined degree, the contacts of the pressure responsive switch 24 are closed. As the vacuum increases, the Phillips gauge 1 passes an A.-C. potential or current which decreases in proportion to the decrease in gas pressure. This alternating current flows through the gas tube 6 and thereby provides illumination at both terminals of the gas discharge tube 6. The alternating current is bypassed by the condenser 7 around the meter 9 so that no indication is provided thereby.

As the gas pressure is reduced to the order of 10 microns, the Phillips gauge becomes a rectifier, and transmits thereafter only pulsating D.-C. current. The polarity of the Phillips gauge merely determines the polarity of the meter 9. This pulsating D.-C. current provides illumination of only one terminal of the gas discharge tube 6, which illumination gradually decreases as the gas pressure in the chamber is progressively reduced. The voltages induced in the secondary winding 11 are rectified by the double diode tube 12 to provide a positive bias on the control electrode of the amplifier tube 14, thereby energizing the relay winding 21 and opening the load circuit contacts 25, 26.

When the gas pressure in the container drops below a predetermined value, for example 5 microns, the positive potential on the control electrode of the amplifier tube 14 decreases, and the normally negative grid bias potential thereon blocks the tube and de-energizes the relay 21, closing the load circuit contacts 25 and 26. It should be understood that the polarity of the diode may be reversed and a reversed relay action utilized to control the load circuit energization. The resistor network comprising the resistors 17, 18 and 20 and the voltage regulator tube 19 provide, in a well known manner, a substantially constant negative control electrode bias potential for the amplifier tube 14.

If it is desired to operate the circuit entirely from alternating potentials, the power source B, the resistor 18 and the voltage regulator 19 may be omitted, and a source of alternating potential may be connected between the terminals A and C, by means of the switches 33, 34 and 35 which may be ganged to operate simultaneously.

I claim as my invention:

1. A vacuum gauge circuit responsive to different gas pressure ranges comprising an ionization type vacuum gauge device subjected to the gases to be measured, a source of alternating potential, a gas discharge device and a unidirectional current indicator all connected in series relation, and a capacitor connected in shunt with said indicator, said ionization device being ionizable and alternating current conducting for all except predetermined low gas pressure values whereby a visible alternating current discharge occurs in said gas discharge device, and said ionization device providing rectification of said alternating potential at pressures lower than said predetermined values whereby said current indicator indicates said low pressure values, said capacitor substantially by-passing alternating currents around said indicator.

2. A vacuum gauge circuit responsive to different gas pressure ranges comprising a Phillips magnetically biased ionization type vacuum gauge device subjected to the gases to be measured, a source of alternating potential, a gas discharge device and a unidirectional current indicator all connected in series relation, and a capacitor connected in shunt with said indicator, said ionization device being ionizable and alternating current conducting for all except predetermined low gas pressure values whereby a visible alternating current discharge occurs in said gas discharge device, and said ionization device providing rectification of said alternating potential at pressures lower than said predetermined values whereby said current indicator indicates said low pressure values, said capacitor substantially bypassing alternating currents around said indicator.

3. Apparatus according to claim 1 including a resistor serially-connected with said indicator, said resistor also being by-passed by said capacitor.

IGOR E. GROSDOFF.